United States Patent
Kazuaki et al.

(10) Patent No.: US 7,798,180 B2
(45) Date of Patent: Sep. 21, 2010

(54) HARNESS FABRICATING APPARATUS

(75) Inventors: Kamei Kazuaki, Kanagawa (JP); Masahiro Osawa, Kanagawa (JP); Ken Sano, Kanagawa (JP)

(73) Assignee: Molex Incorporated, Lisle, IL (US)

(*) Notice: Subject to any disclaimer, the term of this patent is extended or adjusted under 35 U.S.C. 154(b) by 1136 days.

(21) Appl. No.: 10/525,857

(22) PCT Filed: Sep. 2, 2003

(86) PCT No.: PCT/US03/27670

§ 371 (c)(1), (2), (4) Date: Mar. 13, 2006

(87) PCT Pub. No.: WO2004/021368

PCT Pub. Date: Mar. 11, 2004

(65) Prior Publication Data

US 2006/0208057 A1 Sep. 21, 2006

(30) Foreign Application Priority Data

Aug. 30, 2002 (JP) ............................. 2002-255358

(51) Int. Cl.
*B21F 15/08* (2006.01)

(52) U.S. Cl. .................................... 140/112; 140/93 R

(58) Field of Classification Search ................ 140/92.1, 140/93 R, 105, 112, 139, 140; 29/564.4, 29/564.6, 564.8, 566.2, 33 M; 226/45; 250/559.12, 250/559.14, 559.15; 242/333.6, 333.7; 324/97; 356/218, 222

See application file for complete search history.

(56) References Cited

U.S. PATENT DOCUMENTS

| 2,532,964 A | * | 12/1950 | Taylor et al. ................ 356/638 |
| 3,633,835 A | * | 1/1972 | Beers ....................... 242/485.2 |
| 4,130,249 A | * | 12/1978 | Steinhilber ............... 242/480.7 |

(Continued)

FOREIGN PATENT DOCUMENTS

JP      59-105509     *   6/1984

(Continued)

OTHER PUBLICATIONS

International Search Report for PCT/US2003/0027670. Nov. 2, 2004.

*Primary Examiner*—Edward Tolan
(74) *Attorney, Agent, or Firm*—Timothy M. Morella

(57) ABSTRACT

An electric harness fabricating apparatus includes wire reel out means provided for a pressure welding apparatus for pressure-welding a connector a wire of a wire harness; two rotary encoders are provided at a wire supply apparatus for supplying the wire to the pressure welding apparatus and for detecting the of wire supplied from the wire supply apparatus to the pressure welding apparatus. A main computer is provided to calculate the length of wire reeled out by the wire reel out means and a detected value detected by the rotary encoders and calculating a difference therebetween. The computer provides a means for comparing the difference calculated by the calculating means with a previously determined allowable range, and the wire reel out amount abnormality determining means for determining that an actual amount of wire fed out by the wire reel out means is different from the desired reel out amount when the difference exceeds the allowable range by a comparison by the comparing means.

2 Claims, 12 Drawing Sheets

U.S. PATENT DOCUMENTS

| | | | |
|---|---|---|---|
| 4,417,147 A * | 11/1983 | Faville | 250/559.14 |
| 4,709,542 A * | 12/1987 | Krafft | 57/16 |
| 5,063,974 A | 11/1991 | Buckwitz et al. | |
| 5,348,208 A * | 9/1994 | Tamura | 226/24 |
| 5,477,463 A * | 12/1995 | Tamura | 700/117 |
| 5,557,101 A * | 9/1996 | Choi | 250/231.13 |
| 5,943,751 A * | 8/1999 | Kamei | 29/33 M |
| 7,032,814 B2 * | 4/2006 | Blankenship | 235/375 |
| 2001/0052179 A1 | 12/2001 | Dickinson et al. | |

FOREIGN PATENT DOCUMENTS

| | | | |
|---|---|---|---|
| JP | 6-47977 | * | 2/1994 |
| JP | 2004-049352 | | 2/1994 |
| JP | 2004-299907 | | 2/1994 |

* cited by examiner

HARNESS FABRICATING APPARATUS

BACKGROUND OF THE INVENTION

The present invention relates generally to electric wire harness fabricating apparatus, and more particularly, relates to an apparatus for feeding a wire or wires from a wire supply to a wire harness fabricating device.

As is well known, electrical harnesses are provided with a plurality of wires, both ends of which are attached to connectors referred to commonly as a "master" and a "slave" connector and which are used to connect electronic apparatus together by connecting two connectors thereof to the connectors of the apparatus.

The two connectors and wires are held in the wire harness by press-fitting the end portions of the wires into contact with terminals of the two and this is referred to as "pressure welding". The master and the slave connector are formed in a rectangular shapes in a direction orthogonal to the longitudinal direction the wires. The wires are aligned in a longitudinal direction of the connector on the same line by a pitch of a unit of several millimeters and the wires are pressure-welded to the connector terminals.

Pressure welding of the wires and the connectors is carried out by known pressure welding apparatus. The wires are supplied from wire spools provided at a wire supply apparatus to the pressure welding apparatus by a predetermined length. The supply amount is normally matched to a length of the wire disposed on the outermost side of the electric harness. The wire is supplied to the pressure welding apparatus by a pair of upper and lower feed rollers which rotate and the wire utilizing frictional forces produced between the rollers and wire.

The rollers are rotated by utilizing a drive source with a servo motor. When the servo motor is rotated, the servo mechanism is operated in accordance with a rotational number thereof to thereby rotate the rollers. The amount of wire reeled from the rollers is calculated in accordance with the number of rotations of the servo motor. As is known, the servo mechanism refers to a mechanism which is made to follow automatically when input of an apparatus constituting a control object is arbitrarily changed such that an output (position, direction, angle or the like) becomes a previously set object value.

Meanwhile, the supply of the wire to the pressure welding apparatus, is based on the premise that there are no external factors of breakage of the wire insulation, variance of humidity or temperature and the like. However, in case that the wire cannot accurately be transported due to such external factors, a length of the transported wire is not converged into an allowable range and is either excessively long or excessively short. Thus, there is conceivable a case of fabricating a wire harness with wires without a consistent length and there is a concern of deteriorating yield thereby. Naturally, finished harnesses are inspected and when the harness is defective, it is discarded. However, it is preferable to be able to know whether a wire as fed to the fabricating apparatus is provided with a standard, desired length ("standard value") before fabricating a the harness.

The present invention is directed to a fabricating apparatus that increases the yield of production of wire harnesses by determining when the wires do not match a standard value set for the harness.

SUMMARY OF THE INVENTION

It is therefore a general object of the present invention to detect the amount of wire supplied to the harness machine by way of a rotary encoder that detects the wire supply amount. The rotary encoder is preferably an incremental type rotary encoder that detects a rotational direction of a rotating shaft and a count number by an output of two phase pulses. When a pulley is attached to the rotating shaft and the pulley is rotated during supplying the wire, the wire is fed in the direction of rotation, in either a clockwise or counterclockwise direction. The diameter of the pulley is known, so the length of the wire fed for each rotation of the pulley known. Therefore, when the wire feed amount per rotation of the pulley is multiplied by the number of rotations of the pulley, the length of the wire fed from the pullet can be easily determined. Further, since the output is the two phase pulses, the direction of feeding can also simply be determined.

Because the rotary encoder is used, any deviation of wire length may be prevented when the wire is supplied to a fabricating apparatus. Therefore, the wire lengths may be formed in proper desired lengths, and therefore, waste in making incorrect length harnesses may be eliminated. Thus, with the present invention, the production yield of the harnesses may be increased.

The present invention is applicable to a wire supply apparatus for supplying wire to a pressure welding apparatus for pressure-welding connectors to both of the wire ends. Further, according to the invention, wire lengths may be calculated by utilizing the output value of a rotary encoder and processing the output value by a computer.

For example, the invention may be applied to a harness making machine and will include a wire reel out means provided at the pressure welding apparatus for reeling out wire from a wire supply; a rotary encoder provided at the wire supply for detecting the amount of wire supplied from the wire supply to the pressure welding apparatus, means for calculating the length of wire fed out by comparing the amount of wire fed out and a detected value detected by the rotary encoder and calculating a difference therebetween, means for comparing the difference calculated by the calculating means with a previously determined allowable range, and wire reel out amount abnormality determining means for determining that an actual amount of reeling out the wire by the wire reel out means is different from the rectified reel out amount when the difference exceeds the allowable range by a comparison by the comparing means, and operation of the calculating means, the comparing means and the wire reel out amount abnormality determining means is executed by a computer.

There may also be provided means for informing an operator by being operated when the actual amount of reeling out the wire by the wire reel out means is determined to be different from the rectified reel out amount as a result of a determination by the determining means. These and other objects, features and advantages of the present invention will be clearly understood through a consideration of the following detailed description.

BRIEF DESCRIPTION OF THE DRAWINGS

In the course of this detailed description, the reference will be frequently made to the attached drawings in which.

DETAILED DESCRIPTION OF THE PREFERRED EMBODIMENTS

The present invention is best explained by way of one mode for carrying out the wire feeding and measuring operation in the illustrated examples as follows.

Figure 1:
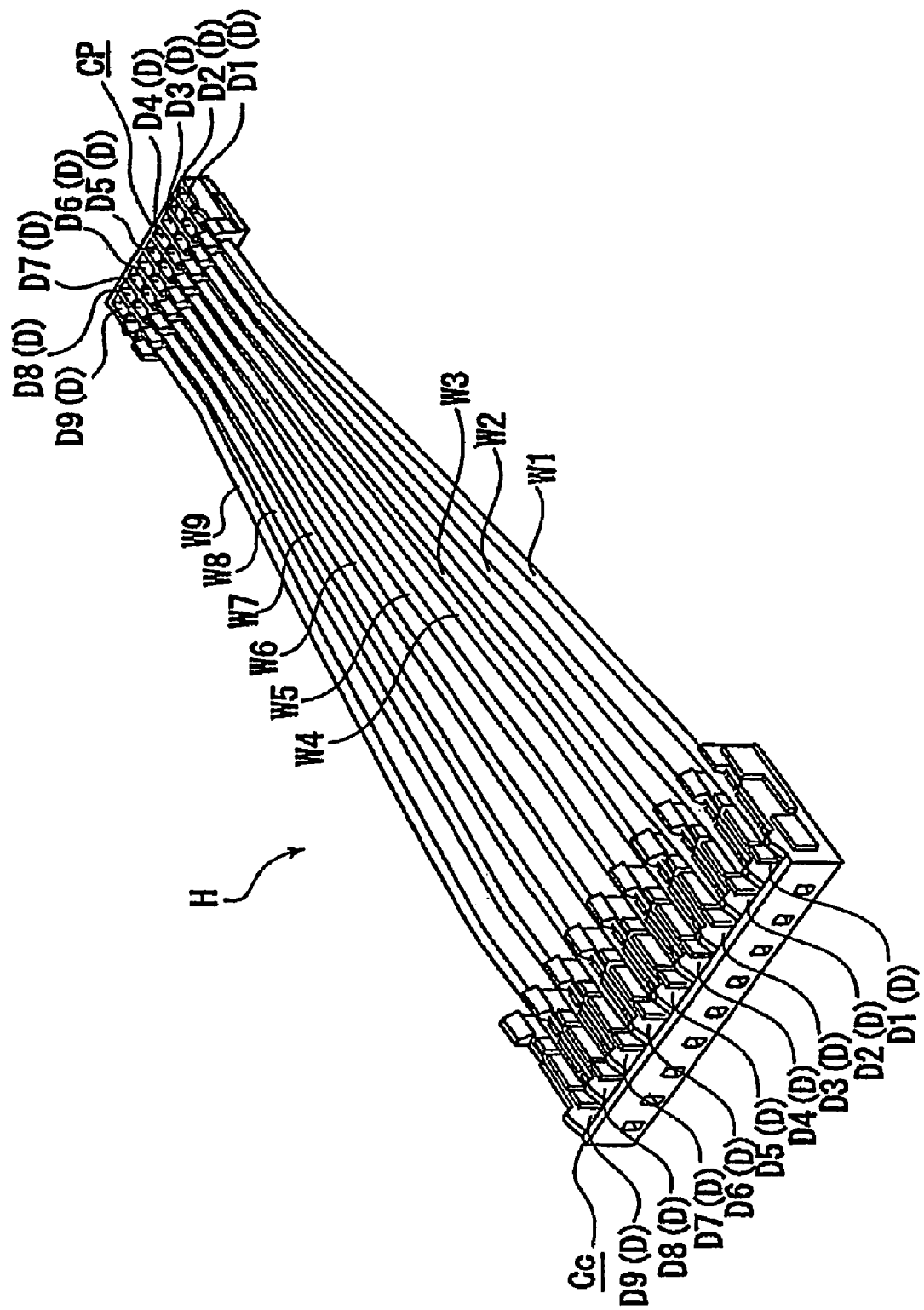
FIG. 1 is a perspective view of a total of an electric harness according to the invention.

As shown in FIG. 1, a wire harness H according to the invention is bonded with a master connector Cp at end portions of a plurality of wires W1, W2, ... aligned laterally and bonded with a slave connector Cc at end portions thereof on other side. The embodiment shows a case of 9 pieces of the wires. Further, the plurality of wires W1, W3, are generally referred as wires W unless particularly designated otherwise.

The connectors Cp and Cc are bonded with the wires W by pressure-welding the respective end portions of the wires to wire end portion containing grooves formed at a plurality of electrodes D1, D2, provided to the master and slave connectors Cp and Cc.

The electrodes D1, D2, are generally referred to as a plurality of electrodes D unless particularly designated otherwise.

Figure 2:
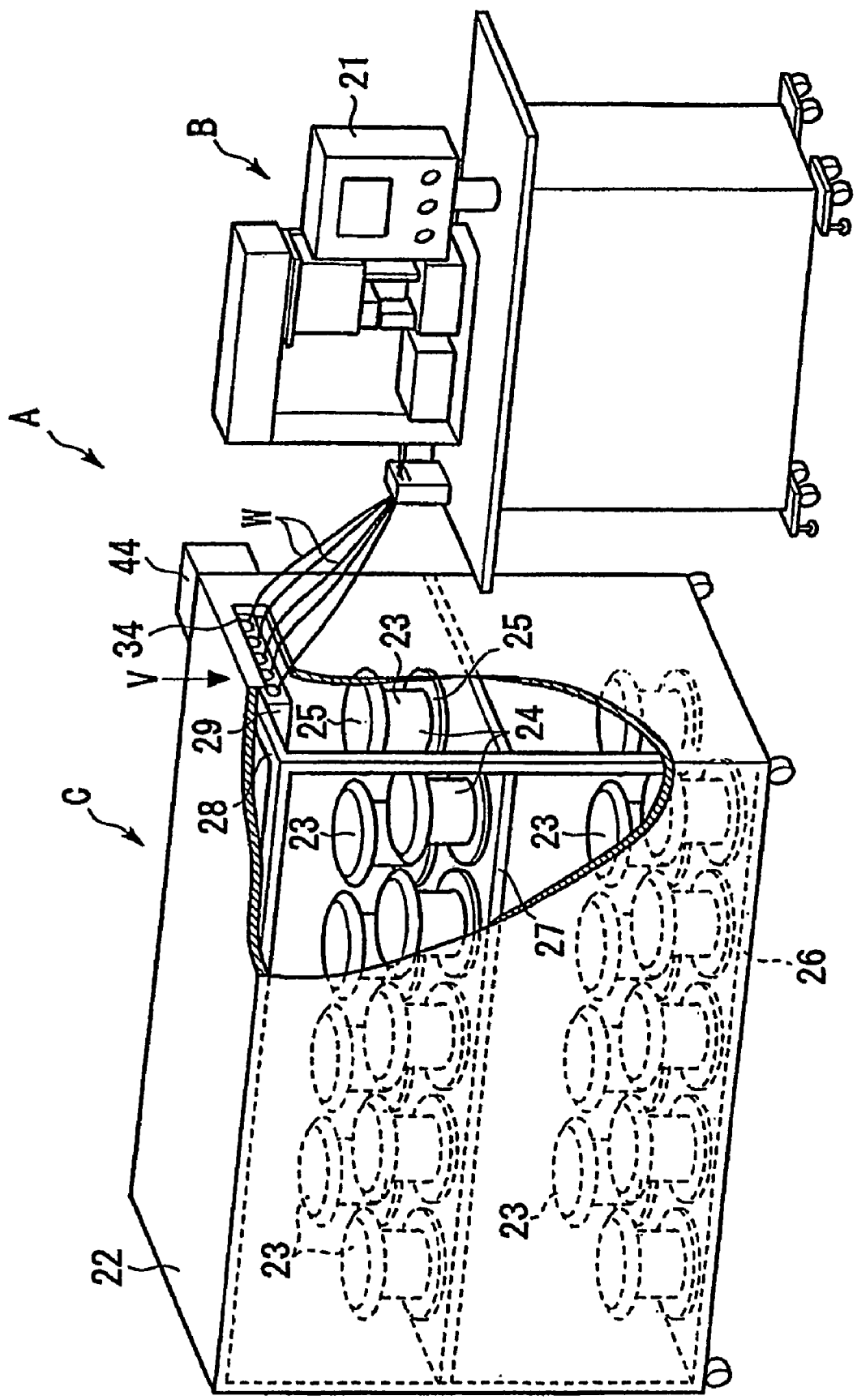
FIG. 2 is an outline perspective view of a total of an electric harness fabricating apparatus according to the invention.
Figure 3:
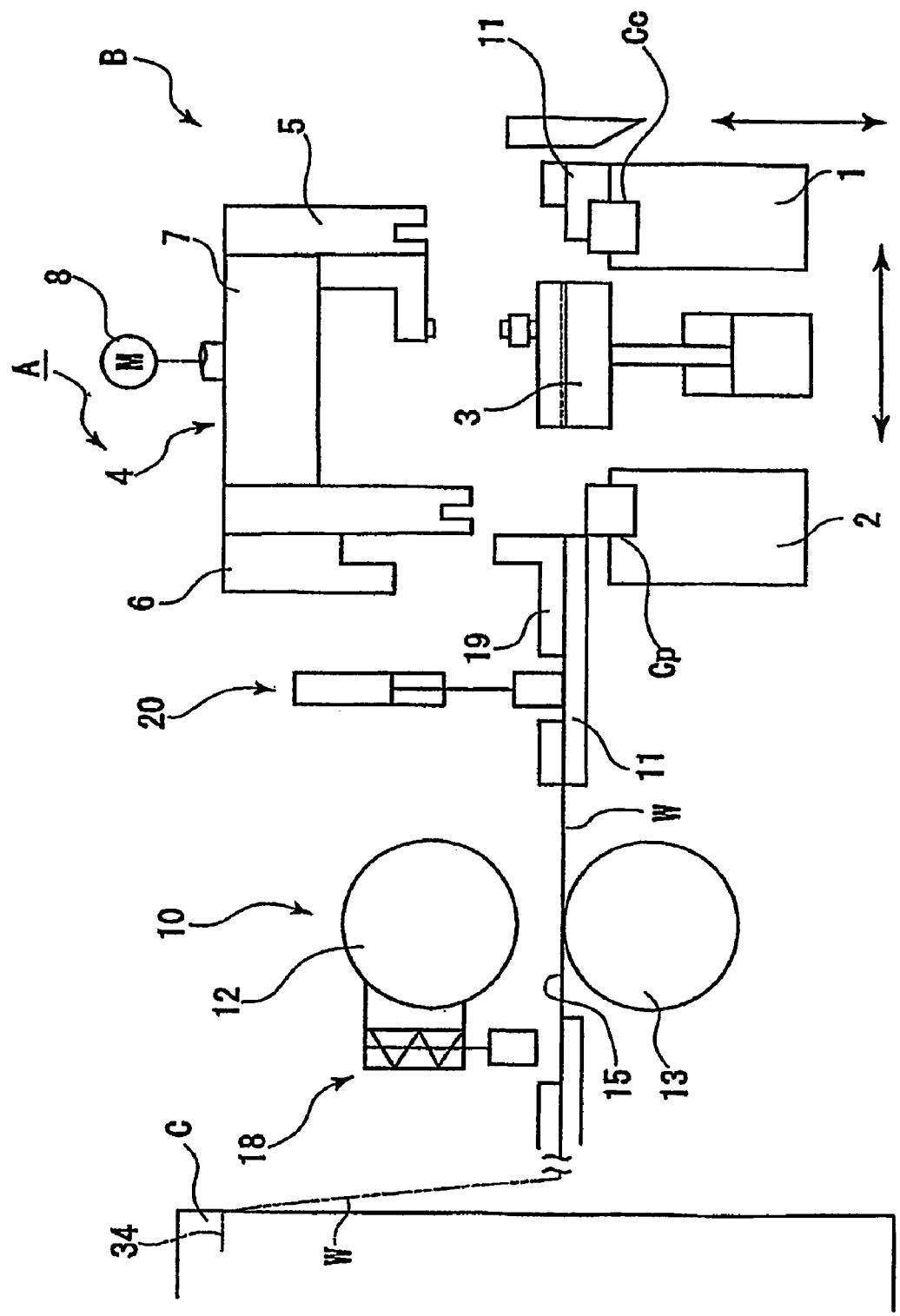
FIG. 3 is a conceptual view of a pressure welding apparatus in the electric furnace fabricating apparatus according to the invention.

Next, a wire harness fabricating apparatus A will be described in reference to FIGS. 2-4. The harness fabricating apparatus A includes a pressure welding apparatus B disposed on the right sides of FIGS. 2 & 3 showing a total of the apparatus A and a wire supply apparatus C disposed on the left sides of the drawings. The pressure welding apparatus B is an apparatus for pressure-welding the wires W and the connectors Cp and Cc and the wire supply apparatus C is an apparatus of supplying the wires W.

First, the pressure welding apparatus B will be explained in reference to FIG. 3 which is a conceptual view thereof. The pressure welding apparatus B includes a slave connector holder 1 disposed on the right side of FIG. 3, a master connector holder 2 disposed at center of the drawing and a carriage 3 moving between the two holders 1 and 2 and guiding the wires W supplied from the wire supply apparatus C to the slave connector holder 1.

The slave connector holder 1 and the master connector holder 2 respectively hold the slave connector Cc and the master connector Cp temporarily during a time period until the connectors are pressure-welded to the wires W.

Further, the pressure welding apparatus B includes a pressure welding portion 4 constituting a portion of actually press-welding the wire W and the connectors.

The pressure welding portion 4 includes a slave connector pressure welding punch 5 and a master connector pressure welding punch 6 for respectively pressure-welding the wires W to the slave connector Cc and the master connector Cp held by the slave connector holder 1 and the master connector holder 2.

The slave connector pressure welding punch 5 is disposed above the slave connector holder 1 and the master connector pressure welding punch 6 is disposed above the master connector holder 2. The respective punches are moved in an up and down direction by a pressure welding ram 7 operated by a servo mechanism with a pressure welding ram driving servo motor 8 as a drive source. The pressure welding ram 7 is moved in the up and down direction by being guided by a pair of parallel guide rails 9, 9 as shown by FIG. 4 which is a front view of the pressure welding apparatus B.

Figure 4:
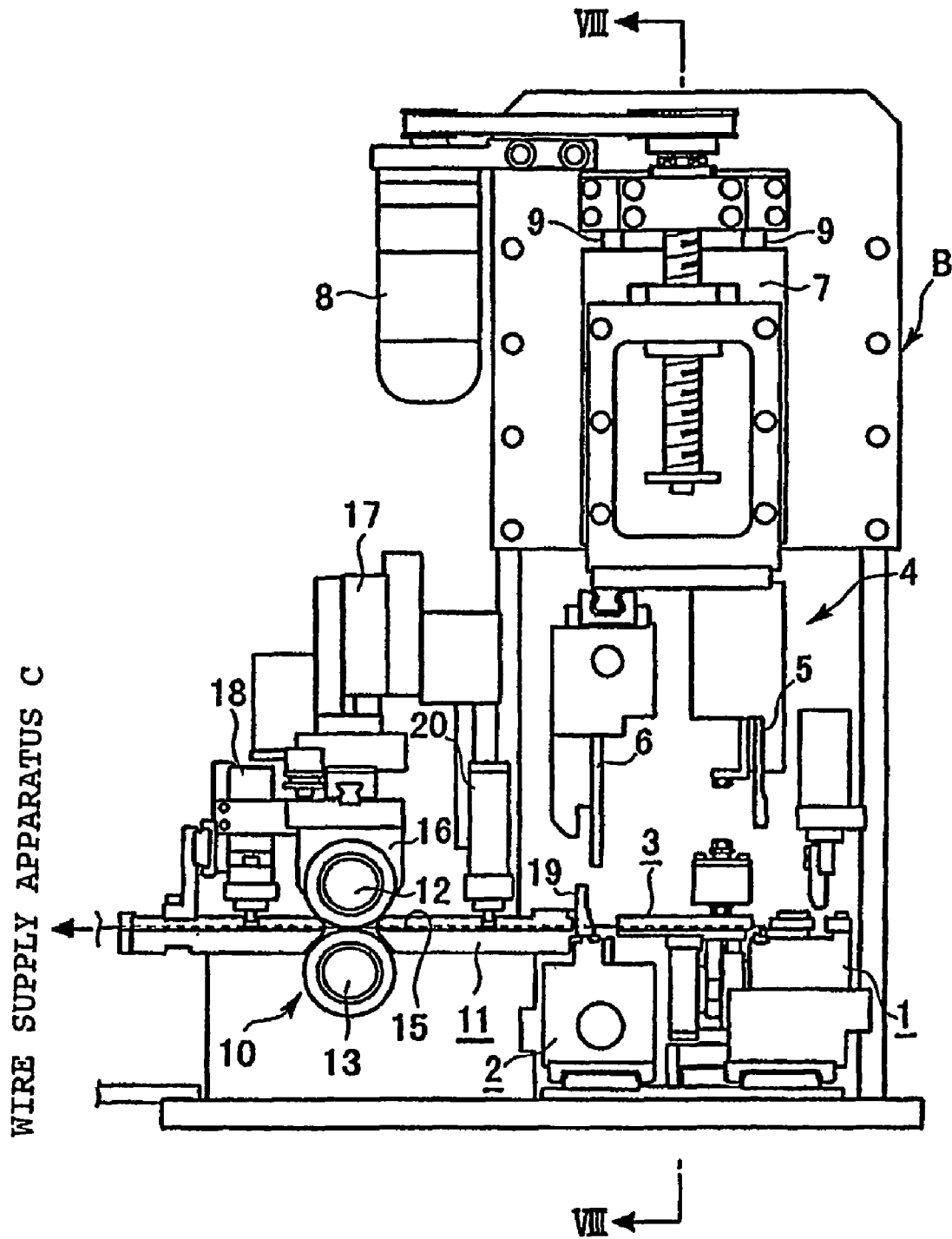
FIG. 4 is a front view of the pressure welding apparatus.

Further, the pressure welding apparatus B includes wire reel out means 10 disposed on the left side of FIGS. 3 & 4 and a wire guiding portion 11 disposed between the wire reel out means 10 and the carriage 3.

The wire reel out means 10 includes pair of rollers 12 and 13 having the same diameter driven by a servo motor, not illustrated. The two rollers are arranged opposedly in the up and down direction and respectively referred to as the upper roller 12 and the lower roller 13. The upper roller 12 and the lower roller 13 clamp the wires W from the wire supply apparatus C in the up and down direction. Further, the upper roller 12 and the lower roller 13 are rotated in a direction of reeling out the wire W to the side of the carriages 3 under the state to thereby reel out the wire W sandwiched by the two rollers. Each of the upper roller 12 and the lower roller 13 is provided with a lane width sufficient for sandwiching a plurality of the wires W aligned in parallel at predetermined intervals. Further, surfaces of the two rollers are flatly knurled to thereby increase the friction coefficient. Therefore, when the two rollers 12 and 13 are rotated, the plurality of wires W are reeled out by a predetermined length by friction force produced between the rollers 12 and 13 and the wires W. A radius of the rollers 12 and 13 is previously determined, further, the rollers 12 and 13 are rotated by the servo motor as mentioned above and therefore, how much is a length of the wire W reeled out from the rollers 12 and 13, is known from the number of rotations of the servo motor.

Further, when an operator of the harness making apparatus A inputs a standard value of the wire W, which is a constituent element of the electric harness H which is going to be fabricated, to the harness making apparatus A, the servo motor for rotating the upper roller 12 and the lower roller 13 is driven, the upper roller 12 and the lower roller 13 are rotated by a rotational number based on the standard value of the wire and therefore, the wire W is reeled out by a rectified amount as mentioned above. That is, there is carried out a control of reeling out the wire W from the wire supply apparatus C to the pressure welding apparatus B. Further, reeling out the wire W by a predetermined amount by rotating the upper roller 12 and the lower roller 13, is referred to as length measurement by a term used in the industry. The rotating servo motor rotates the upper roller 12 and the lower roller 13 involving the length measurement. Therefore, the servo motor is referred to as a length measurement servo motor for convenience. The length measurement servo motor is conceptually shown only in FIG. 10 by using notation 14.

The lower roller 13 is disposed slightly lower than a position of passing the wire W in order to prevent interference with the wire W as pressure-welded. A path of the wire W is designated by notation 15. Further, as shown by FIG. 4, the upper roller 12 is supported by an upper roller supporting member 16 slightly above the path 15 of the wire W.

The upper roller supporting member 16 is provided with an upper roller moving mechanism 17 for clamping and releasing the wire W between the upper roller 12 and the lower roller 13 by moving the upper roller 12 in the up and down direction. When the upper roller 12 is moved in the up and down direction by the upper roller moving mechanism 17, the upper roller 12 becomes remote from and proximate to the lower roller 13.

The lower roller 13 and the upper lower 12 carry out accurate length measurement since the two rollers are rotated simultaneously in the state of sandwiching the plurality of wires W between the two rollers. Further, a length of the wire W reeled out by the electric wire reel out means 10 including the upper roller 12 and the lower roller 13, is referred to as a wire reel out amount.

Further, the wire reel out means 10 includes an individual cramp 18 for preventing unprepared reel out or return of the wire W finished with length measurement, cutting and pressure welding.

Next, a wire guide portion 11 disposed next to the right side of the wire reel out means 10 will be described. The wire guide portion 11 is a comparatively long guide extended in a direction from the left side to the right side of FIG. 3, which is the direction of transporting the wire W. The wires W reeled out from the wire reel out means 10 are guided to the pressure welding portion 4 via the wire guide portion 11. Further, the wire guide portion 11 includes a cut die 19 for cutting the wire W. The cut die 19 cuts the plurality of wires W when the wires W are pressure-welded to the master connector Cp.

The cut die 19 is disposed at an end portion of the wire guide portion 11 of two end portions thereof on the side of the pressure welding portion 4. Further, there is provided a summarizing clamp 20 for fixing the wires W in cutting the wires by the cut die 19 by summarizingly clamping all of the wires W on the side of the wire reel out means 10 of the cut die 19.

Further, in the pressure welding apparatus B shown in FIG. 4, from the left side to the right side, the wire reel out means 10—the wire guide portion 11—an upper face of the master connector holder 2—the carriage 3—an upper face of the slave connector holder 1, are disposed on the same axis line.

Further, the wire W supplied from the wire supply apparatus C to the wire reel out means 10, becomes the harness H after having been subjected to processings of the wire reel out means 10—the wire guide portion 11—the master connector holder 2—the carriage 3—the slave connector holder 1 and other necessary portions, not illustrated, and discharged from the fabricating apparatus A by the operator. The steps of fabricating the electric harness per se are well known and do not constitute the gist of the invention and therefore, an explanation thereof will be omitted.

Further, a portion designated by notation 21 in FIG. 2 is a main computer governing a control of a total of the electric harness fabricating apparatus. The operator inputs the standard value of the length of wire W which is the constituent element of the harness H which is going to be fabricated, as described above, via inputting means (for example, touch panel, keyboard or the like) of the main computer 21.

Next, the wire supply apparatus C will be explained in reference to FIGS. 2-7. The wire supply apparatus C supplies a predetermined length of the wire W to the pressure welding apparatus B.

Further, the wire supply apparatus C includes a cabinet 22 in a shape of a hollow parallelepiped and a plurality of wire bobbins 23 contained therein. The wire bobbin 23 is a wire supply member and is wound with the wire W, which is a constituent element of the electric harness H around a cylindrical barrel portion 24 for each of the wire bobbins 23. Further, flanges 25 are provided at both ends of the barrel portion 24 to thereby prevent the wire W from drawing from the barrel portion 24.

Figure 5:
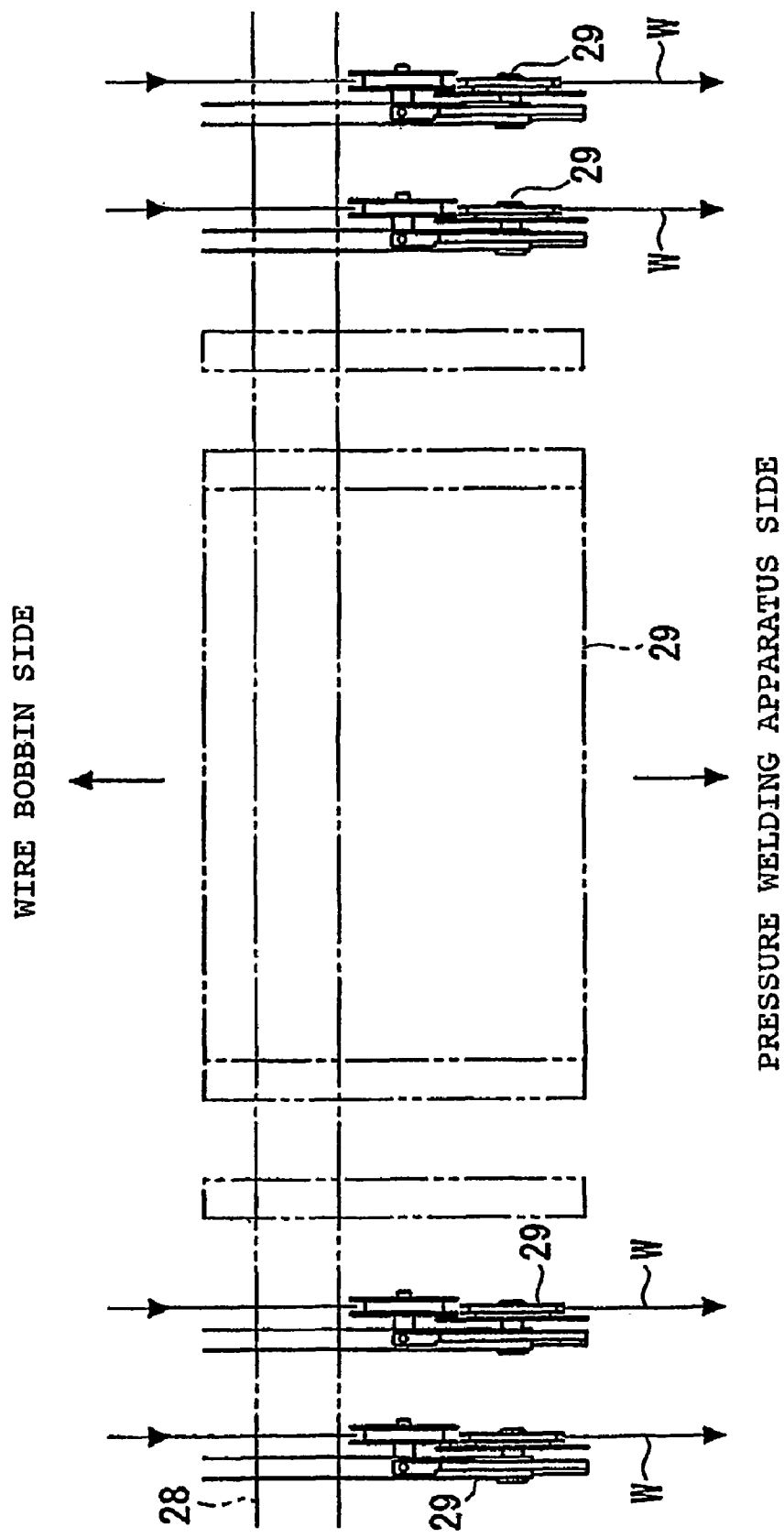
FIG. 5 is a plane view of an arrangement of a rotary encoder viewed from an arrow mark V direction of FIG. 2.

The wire bobbin 23 is contained in the cabinet 22 in an erected state by disposing an end face of one of the flanges 25 on the lower side. The wire bobbins 23 are arranged in longitudinal two rows respectively at a bottom plate 26 provided in the cabinet 22 and a middle plate 27 in parallel with the bottom plate 26. The wire W wound around the wire bobbin 23 at an upper stage is for use in making the harness H. The wire bobbin 23 placed at a lower stage is a spare. Further, at an upper edge 28 of the cabinet 22, the wires W drawn from the wire bobbins 23 are aligned at equal intervals in the longitudinal direction of the upper edge portion 28. In aligning the plurality of wires W at the upper edge portion 28, at the upper edge portion 28, a plurality of rotary encoders 29 are installed in the longitudinal direction. FIG. 5 is a view showing to pick up only the plurality of rotary encoders 29 attached to the upper edge portion 28.

The rotary encoder 29 is a supply amount detecting apparatus for detecting a supply amount of the wire W from the wire supply apparatus C to the pressure welding apparatus B (supply amount) and, according to the embodiment, an incremental type rotary encoder widely used generally is shown. The incremental type rotary encoder is a sensor apparatus for detecting movement of a rotating shaft from a rotational direction and a count number of the rotating shaft by outputting two-phase pulses. A description will be given of the sensor apparatus in details. In the plurality of rotary encoders 29, the rotary encoders 29 of a number coinciding with a number of the wires W of the electric harness H to be fabricated are operated. For example, assume that a number of installing the rotary encoders 29 is 10. Further, in the case of fabricating the electric harness H having 9 pieces of the wires, 9 of the rotary encoders 29 are operated. The respective rotary encoder 29 is attached to the upper edge portion 28 via an attaching plate 30 as shown by FIG. 6.

Further, a maximum number of installing the rotary encoders 29 coincides with a number of the wire bobbins 23 placed at the upper stage. Further, as shown in FIG. 6, between the wire bobbin 23 and the rotary encoder 29, there are installed a weight 31 for providing tension, a smallish idler pulley 32 on the upstream side of the weight 31, in other words, on the side of the wire bobbin 23 and a large idler pulley 33 on the downstream side of the pulley 32 for the respective encoder 29.

The wire W wound around the wire bobbin 23 flows from a wire discharge port 34 of the wire supply apparatus C to the wire reel out means 10 on the side of the pressure welding apparatus B by way of the smallish idler pulley 32—the largish idler pulley 33—the weight 31—the rotary encoder 29. Further, the wire W is wound around the largish pulley 33 in a state of being wound by one turn.

Figure 6:
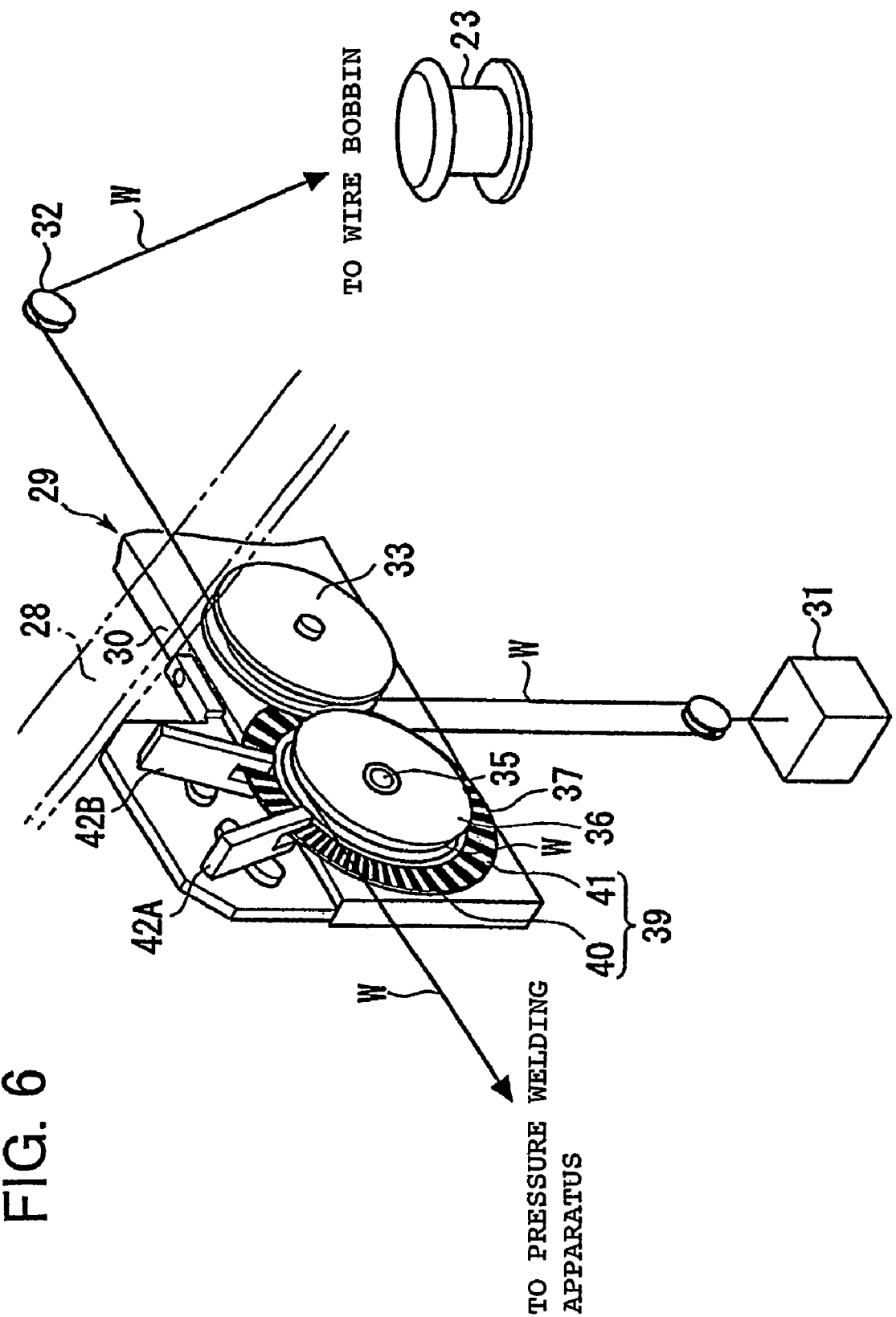
FIG. 6 is a perspective view enlarging an essential portion of FIG. 5.
Figure 7:
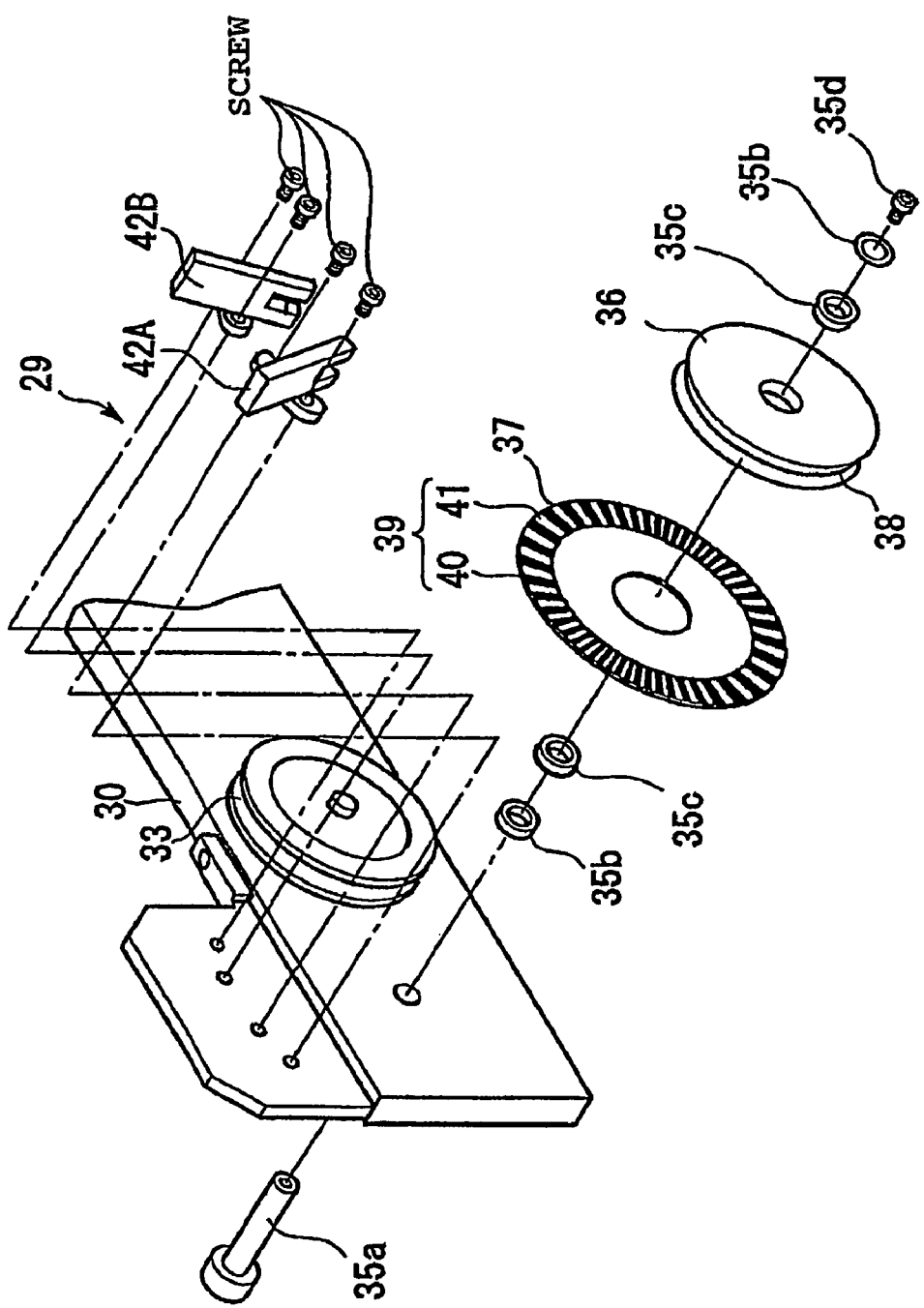
FIG. 7 is a disassembled perspective view of FIG. 6.

Further, according to the embodiment, as shown by FIGS. 6-7, there is disclosed the rotary encoder 29 including a rotating shaft 35 provided at the attaching plate 30 of the upper edge portion 28, a pulley 36 fixed to the rotating shaft 35, a slit circular disk 37 fixed coaxially with the rotating shaft 35, and a photosensor 42A and a photosensor 40B attached around a surrounding of the slit circular disk 37. The rotating shaft 35 includes a shaft 35a, a spacer 35b, a bearing 35c, and a screw 35d, and the rotating shaft 35 is constituted by applying these to the pulley 36 and the slit circular disk 37.

The pulley 36 includes a slender groove: a strip wire groove 38 for hanging the wire W at a peripheral edge thereof. The slit circular disk 37 is formed with slits 39 extended radially from a center thereof and formed at equal intervals. The slit 39 comprises a light blocking portion 40 and a transmitting portion 41.

The photosensor 42A and the photosensor 42B each includes a light emitting element and a light receiving element, not illustrated. The light emitting element and the light receiving element are opposedly arranged at an interval (detection groove) therebetween. Light is emitted from the light emitting element to the light receiving element to thereby form an optical path between the two elements. Further, when the light blocking portion 40 of the slit circular disk 37 passes the interval of the detection groove, light emitted from the light emitting element is hampered from advancing and therefore, the optical path is blocked.

On the contrary, when the transmitting portion 41 crosses between the light emitting element and the light receiving element, advance of light which has been blocked by the light blocking portion 40 is recovered and the optical path is recovered. Therefore, when the case of blocking the optical path is set to OFF and the case of recovering the optical path is set to ON, the photosensor 42A and the photosensor 42B alternately repeat ON/OFF in accordance with rotation of the slit circular disk 37.

Output waveforms of the photosensor 42A and the photosensor 42B are respectively referred to as A phase and B phase. Here, two pieces of the photosensors 42A and 42B are used to be able to determine whether the pulley 36 is rotated regularly as mentioned later. That is, when the pulley 36 is rotated in a direction reverse to that in supplying the wire W by some external force, the photosensors are used for preventing the rotation from determining as regular rotation.

The pulley 36 having the rotary encoder 29 is rotated in a constant direction, a state in which the photosensor 42A and the photosensor 42B are made ON is designates as "1" and a state in which these are made OFF is designated as "0". Then, a combination of A phase and B phase is progressed in a way of 00→10→11→01→00 . . . with an elapse of time. This is referred to as regular rotation of the pulley 36 for convenience. When the pulley 36 is brought into a state of being rotated regularly, the wire W is reeled out from the wire bobbin 23 to the side of the pressure welding apparatus B.

Further, the photosensor 42A and the photosensor 42B are arranged to shift in a circumferential direction such that the respective output waveforms are shifted by a ¼ period. Therefore, a minimum detection unit becomes the ¼ period of the slit interval and a rotational amount and a rotational direction of the pulley 36 can be detected by a phase difference (time difference) between outputs of the photosensor 42A and the photosensor 42B. That is, a number of the slits multiplied by 4 is a resolution when the pulley 36 makes one turn.

A resolution refers to an amount of representing a function of an apparatus capable of identifying different objects when the same kind of objects proximate to each other are measured and observed. In other words, a resolution is a difference of input signals proximate to each other capable of identifying input signals as output signals in a measuring apparatus or a measuring method.

Further, the photosensor 42A and the photosensor 42B are attached to the attaching plate 30 by attaching means of a fixing screw or the like. The photosensor 42A and the photosensor 42B are electrically connected to a computer 44 of FIG. 2 installed at the wire supply apparatus C. Two phases of A phase and B phase which are respective output waveforms of the photosensor 42A and the photosensor 42B, are transmitted to a detection portion control circuit 45 (refer to FIG. 10), mentioned later, of the computer 44. Further, in contrast to the main computer 21 governing the control of the total of the electric harness fabricating apparatus A, the computer 44 totals pulse outputs of A phase and B phase, mentioned above, transmitted from the respective rotary encoder 29 and transmits the pulse outputs to the main computer 21 and is referred to as sub computer 44 in contrast to the main computer 21. The two computers are started by switching on a power source, not illustrated, for the pressure welding apparatus B.

Figure 8:
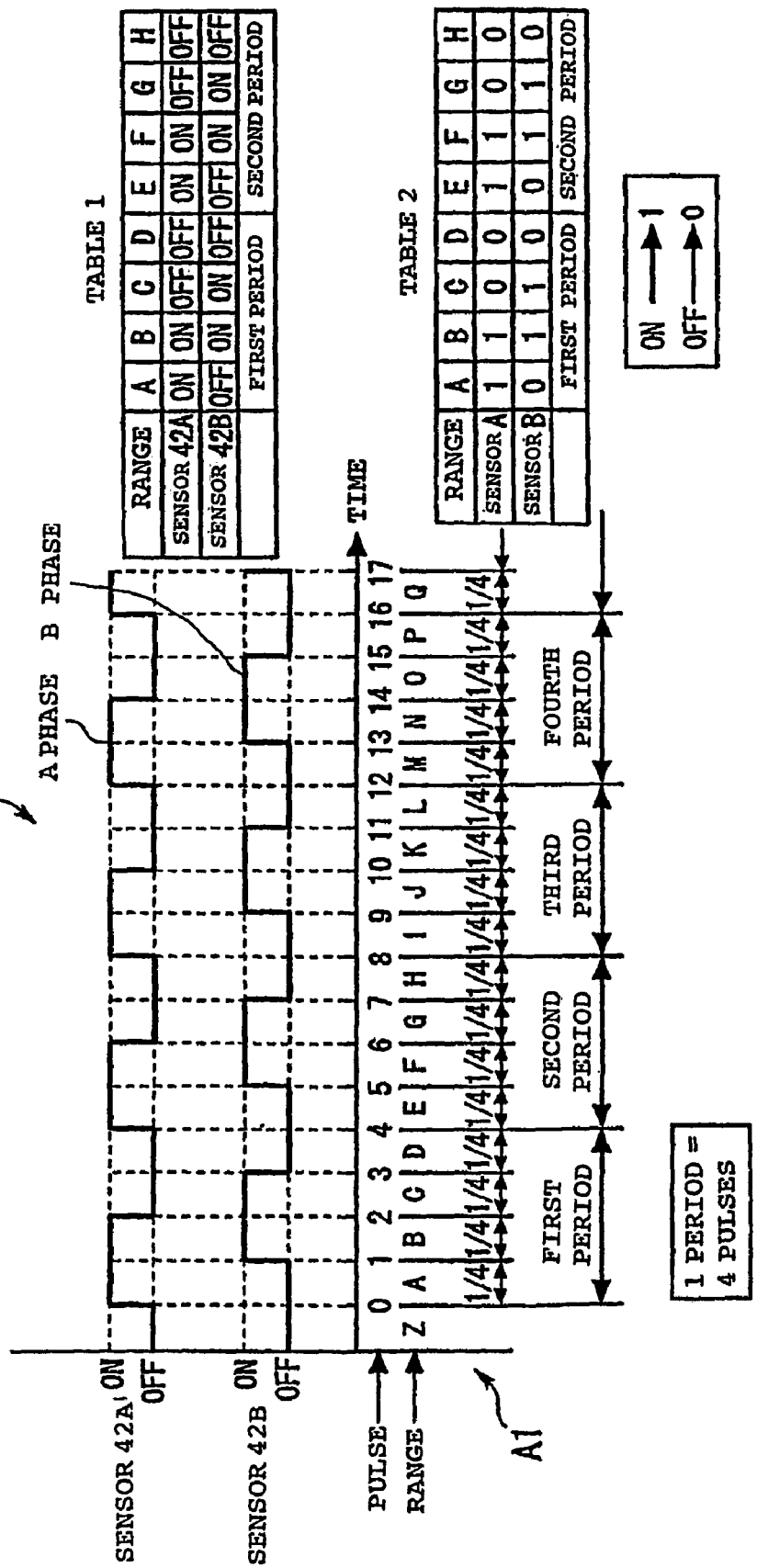
FIG. 8 is arranged with a graph and tables for explaining a relationship between elapse of time and direction determination and change amounts of A phase/B phase in the case of rotating a pulley regularly when output waveforms of a pair of photosensors of the rotary encoder according to the invention are respectively designated as A phase and B phase.

FIG. 8 is arranged with a graph and tables for explaining a relationship between elapse of time and direction determination and change amounts of A phase/B phase in the case of regular rotation.

In graph G1 of FIG. 8, the ordinate designates ON/OFF states of the photosensor 42A and the photosensor 42B and the abscissa designates elapse of time. Further, in a range diagram A1 disposed below graph G1 and extended in the abscissa direction of graph G1, one period of the pulley 36 is constituted by 4 pulses and in correspondence with the pluses, a plurality of ranges starting from A (ranges of A through Q are illustrated) are provided along the abscissa of graph G1. For example, at a first period, pulses are 0 through 4 and ranges are 4 of A through D, at a second period pulses are 4 through 8 and ranges are 4 of E through H, at a third period, pulses are 8 through 12 and ranges are 4 of I through L and at a fourth period, pulses are 12 through 16 and ranges are 4 of M through Q, and 4 pulses are required for making one turn. Further, although there is range Z next to range A on the left, range Z signifies a state before switching on the power source. Therefore, in the state, the wire W is not reeled out and therefore, the state is the same as a state in which light is not emitted from the respective light emitting elements to the respective light receiving elements of the photosensor 42A and the photosensor 42B, in other words, a state in which light paths between the respective light emitting elements and the respective light receiving elements of the photosensor 42A and the photosensor 42B are blocked. Therefore, in range Z, both of the photosensor 42A and the photosensor 42B are brought into an OFF state.

Further, Table 1 corresponds to the graph G1 and the range diagram A1. Table 1 shows ON/OFF states (A phase and B phase, mentioned above) of the photosensor 42A and the photosensor 42B. Further, Table 2 shows a table rearranging Table 1 by defining "ON state" of the photosensor 42A and the photosensor 42B of Table 1 as "1" and defining "OFF" state thereof as "0".

Figure 9:
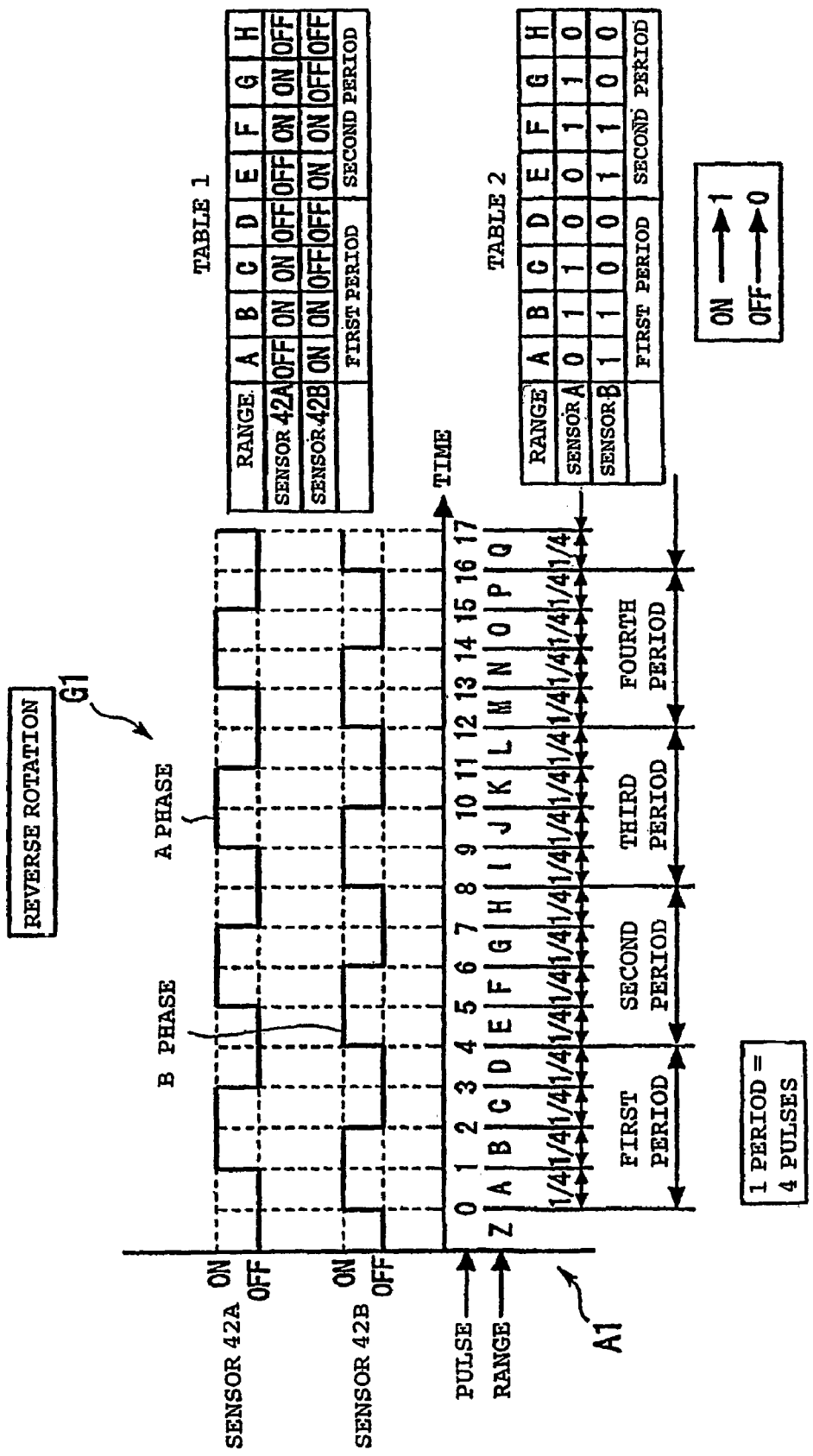
FIG. 9 is arranged with a graph and tables for explaining a relationship between elapse of time and direction determination and change amounts of A phase/B phase in the case of rotating a pulley reversely when output waveforms of a pair of photosensors of the rotary encoder according to the invention are respectively designated as A phase and B phase.

FIG. 9 is arranged with a graph and tables for explaining the relationship between elapse of time and direction determination and change amounts of A phase/B phase in the case of reverse rotation. The basic setting method is the same as that of FIG. 8. A point of difference between the two drawings resides in a phase difference between A phase and B phase and the two phases are shifted by a ¼ period as described above.

Although in the case of regular rotation, as shown by Table 2, the rotation is progressed as (00→) 10→11→01→00..., in the case of reverse rotation, the rotation is regressed as in 00→01→11→10→(00).... Further, (00) assumes the case of range Z.

It is known from FIG. 8 that in the case of regular rotation of an amount of specific pulses, the amount of reeling out the wire W can be measured (calculated). Further, it is known from FIG. 9 that in the case of reverse rotation of an amount of specific pulses, how much the wire W is rewound in the reverse direction, can be measured (calculated).

A description will be given by taking an example of the case of regular rotation.

When a number of the slits 39 provided to the slit circular disk 37 is set to 100, a diameter of the pulley 36 is set to 40 mm, the circle ratio is set to $\pi=3.14$ and the slit circular disk 37 is rotated by an amount of 10 pulses, the main computer 21 calculates the amount of reeling out the wire W as (3.14×40 mm)/(4×100 pulse/rotation)×10 pulse=3.14 mm.

By using the rotary encoder 29 in this way, the supply (transfer) amount of the wire can finely be calculated. Further, the pulses are counted by a counter circuit 47, mentioned later, provided to the sub computer 44 of the wire supply apparatus C.

The main computer 21 is provided with a function of calculating means for comparing the amount of reeling out the wire W by the wire reel out means 10 and a detected value by the rotary encoder 29 and calculating a difference between the two numerical values.

The main computer 21 which is the calculating means functions also as comparing means for comparing the difference with a previously determined allowable range, not illustrated. Further, when the difference exceeds the allowable range by a comparison, the main computer 21 which is the comparing means functions also as a wire reel out amount abnormality determining means for determining that there is an abnormality in an actual reel out amount (measured length) by the wire reel out means 10.

Figure 10:
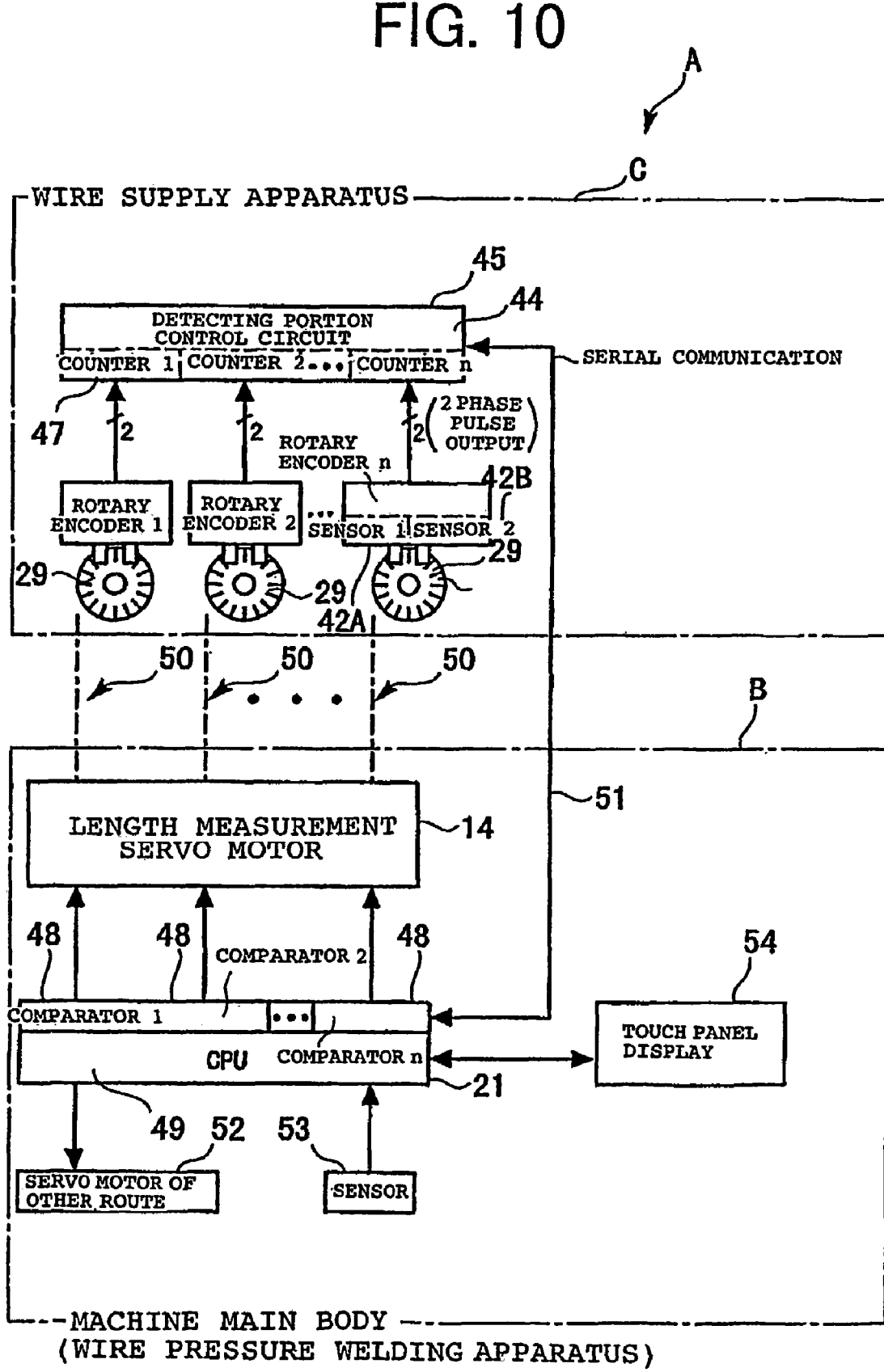
FIG. 10 is a block diagram of the electric harness fabricating apparatus according to the invention.

FIG. 10 is a block diagram for understanding functions of the pressure welding apparatus B and the wire supply apparatus C of the electric furnace fabricating apparatus A according to the embodiment.

In the block diagram, the detecting portion control circuit 45 of the sub computer 44 of the wire supply apparatus C is electrically connected to the plurality (n pieces in the embodiment) of rotary encoders 29 which are detecting portions. Pulses of two phases of A phase and B phase, mentioned above, of the photosensors 42A and 42B are respectively outputted from the respective rotary encoders 29 to the detecting portion control circuit 45. The detecting portion control circuit 45 is provided with a plurality (n pieces in the embodiment) of the counter circuits 47 in correspondence with the respective rotary encoders 29. The counter circuit 47 is a circuit of counting input pulse signals, each of which signifies the length of reeling out the wire W. The counted value is referred to as a counter value. The counter value and the length of reeling out the wire W is in a proportional relationship. That is, when the counter value is large, the length of reeling out the wire W is long and when the counter value is small, the length is short.

Further, the main computer 21 of the pressure welding apparatus B is provided with comparators 48 which are comparing circuits of a number in correspondence with that of the plurality of rotary encoders 29. The comparator 48 is electrically connected to CPU 49 of the main computer 21 and CPU 49 is connected to the length measurement servo motor 14 via the respective comparator 48.

The length measurement servo motor 14 is connected to each of the rotary encoders 29 via a code 50.

CPU 49 and the detecting portion control circuit 45 are electrically connected via a serial cable 51 and can carry out bi-directionally communicatable serial communication.

In the serial communication, the respective counter values of n pieces of the rotary encoders 29 are transmitted to the main computer 21.

The main computer 21 compares to determine whether an instruction value given from the comparator 48 to the length measurement servo motor 14, that is, an absolute value of the difference between the amount of reeling out the respective wire W in accordance with the rotational amount (number) of the length measurement servo motor 14 and the respective counter value falls in the predetermined allowable range by the respective comparator 48. When the absolute value does not fall in the allowable range by the determination, the main computer 21 determines that the wire length does not fall in the allowable range. When such a determination is made, the main computer 21 determines that a failed product is produced or can be produced and the pressure welding apparatus B stops driving.

Further, CPU 49 is connected also to other route of a servo motor 52, various sensors 53, peripheral apparatus 54 such as a display which is displaying means, a keyboard which is inputting means, a touch panel and so on and the allowable range can be set by the touch panel or the like.

Figure 11:
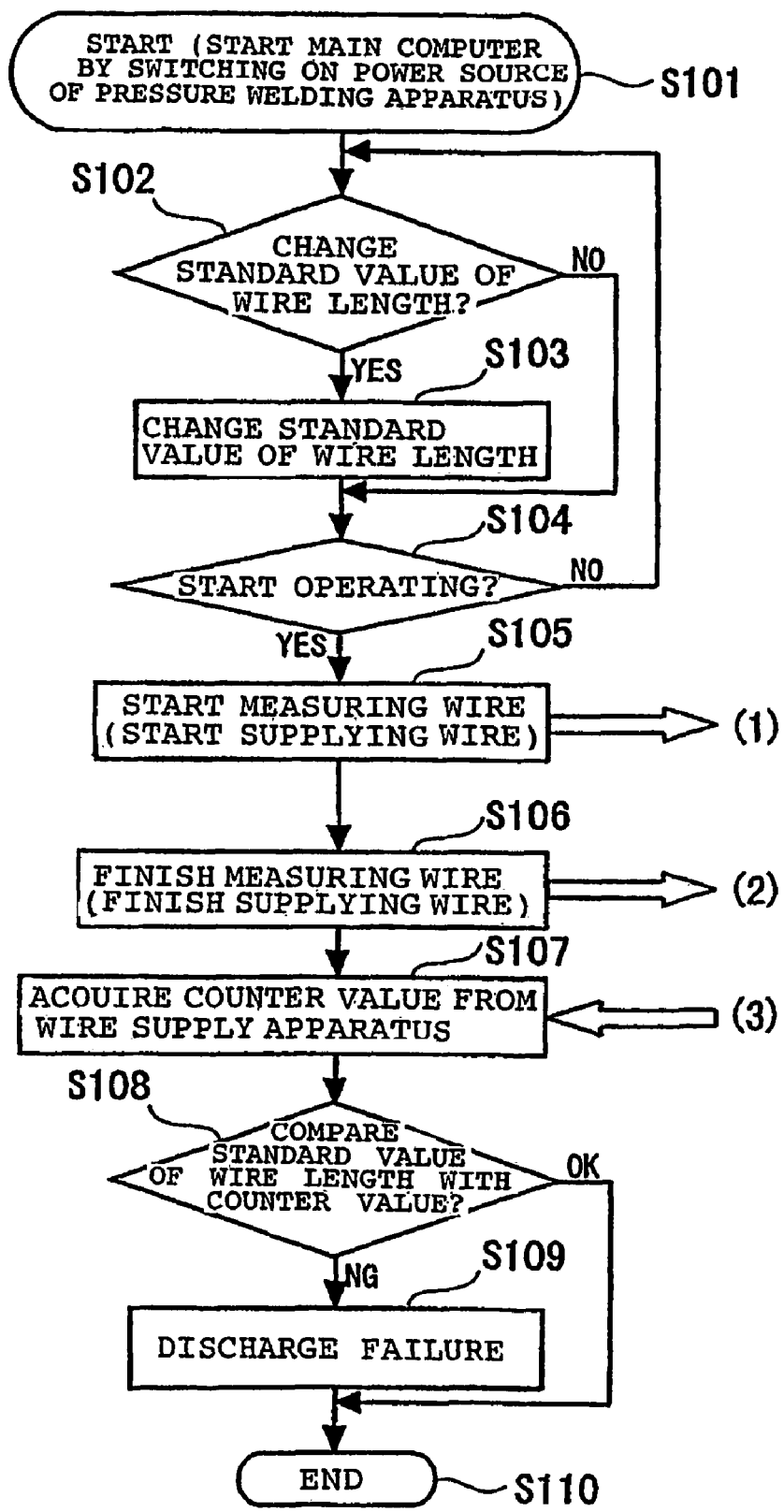
FIG. 11 is a portion of a flowchart in which when a length of a wire which is a constituent member of the electric harness is not a rectified value, the length is determined as a failure by using the electric harness fabricating apparatus according to the invention; and, FIG. 12 is a portion of the flowchart continuous to FIG. 11.

Next, it is described for a flow until determining the length of the wire W which is a constituent member of the harness H as a failure when the length is not the rectified value, in reference to a flowchart of FIG. 11.

Figure 12:
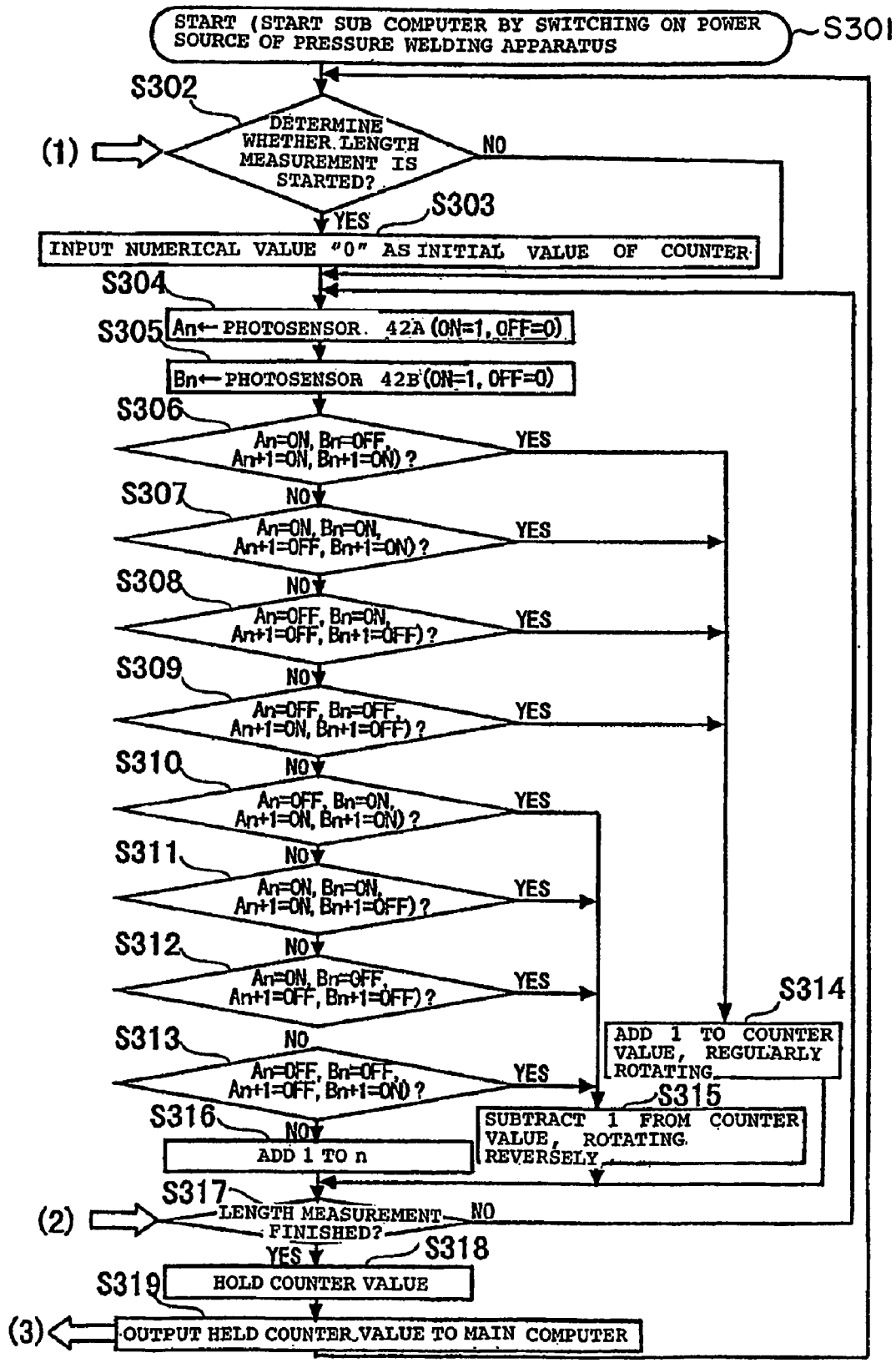

Although FIG. 11 and FIG. 12 are to be shown summarizingly on the same paper face inherently, the drawings are divided due to space of the paper face.

Same notations of notations (1) through (3) shown in FIG. 11 with arrow marks and notations of (1) through (3) shown in FIG. 12 with arrow marks correspond to each other signifying destinations of transferring information.

First, the flowchart of the main computer 21 mounted to the pressure welding apparatus B will be described. At S101, the power source of the pressure welding apparatus B is switched on to thereby start the main computer 21.

At S102, it is determined whether the length of the wire W which is the constituent member of the electric harness H intended to fabricate is changed (which is displayed on the flowchart by using a language of "Change standard value of wire length?"). This is because there is a case of fabricating a different kind of harness H having a different wire length by using the pressure welding apparatus B.

The case of changing the standard value of the wire length is the case of fabricating the different kind of the electric harness H having a wire length different from that of the electric harness H which has been fabricated. The case in which the standard value of the wire length is not changed, is a case of fabricating the electric harness H having a wire length the same as that of the electric harness H which has been fabricated.

In the case of affirmative determination at S102, the operation proceeds to S103 and in the case of negative determination the operation proceeds to S104. In the case of affirmative determination, is fabricated a separate electric harness H having a wire length different from that of the electric harness H which has been fabricated. In the case of negative determination, fabrication of the electric harness H having the same length of the wire W is continued.

At S103, the standard value of the wire length is changed since the separate electric harness H is going to be fabricated from the step by using a different length of the wire W.

When the determination is negative at S102 and the standard value of the wire length is not changed, the standard value of the wire length remains unchanged.

At S104, it is determined whether the pressure welding apparatus B truly starts driving in the state of changing the standard value of the wire length. In the case of affirmative determination at S104, the operation proceeds to S105 and in the case of negative determination, the operation returns to S102.

At S105, the rotational number of the length measurement servo motor 14 for driving the upper roller 12 and the lower roller 13 is adjusted such that a rectified amount of reeling out the wire (rectified reel out amount) based on the standard value of the wire W is changed and length measurement of the wire W is started under the state. Information of starting length measurement is transmitted from the main computer 21 to the sub computer 44 via the serial cable 51 (refer to FIG. 10, arrow mark (1) of FIG. 11 and S302, mentioned later). Further, length measurement of the wire is started simultaneously with starting to supply the wire.

At S106, length measurement of the wire is finished. Information of finishing length measurement of the wire W is transmitted from the main computer 21 to the sub computer 44 via the serial cable 51 (refer to FIG. 10, arrow mark (2) of FIG. 11 and S206, mentioned later). Further, length measurement of the wire is finished simultaneously with finishing to supply the wire.

At S107, the counter value is transmitted from the sub computer 44 of the wire supply apparatus C to the main computer 21 via the serial cable 51 (refer to FIG. 10, arrow mark (3) of FIG. 11 and S319, mentioned later). This is expressed in the flow chart as "acquire counter value from wire supply apparatus".

At S108, the standard value of the wire W described in explaining S103 and the respective counter value are compared. Further, the amount of reeling out the wire W by the upper roller 12 and the lower roller 13 which are the wire reel out means 10 and the detected value detected by the rotary encoder 29 are compared and the difference therebetween is calculated respectively for all of the wires. Further, it is determined whether the difference is included in a previously determined allowable range. This is expressed in the flow-chart as "Compare standard value of wire length with counter value?".

In the case of affirmative determination at S108, that is, when the difference falls in the allowable range, the operation proceeds to S110. Further, in the case of negative determination, that is, when the difference does not fall in the allowable range, it is determined that the actual reel out amount of the wire W by the wire reel out means 10 differs from the rectified reel amount value (abnormal) and the operation proceeds to S109. The allowable range signifies that when the difference falls in the allowable range, even when the electric harness H is fabricated by using the wire W having the length reeled out by the wire reel out means 10, the electric harness H is sufficiently applicable as a regular product.

At S109, since the difference does not fall in the allowable range, the electric harness H is determined to be a failed product and at successive S110, the pressure welding apparatus B stops driving and the series of processings are finished. This is represented in the flowchart as "discharge failure". The determination is carried out for the respective wires.

FIG. 12 is a flowchart at the counter circuit. At S301, the power source of the pressure welding apparatus B is switched on to thereby start the sub computer 44.

At S302, it is determined whether length measurement is started after switching on the power source of the pressure welding apparatus B. In the case of affirmative determination, the operation proceeds to S303 and sets the counter to 0 and in the case of negative determination, the operation proceeds to S304.

At S303, numerical value "0" is inputted as an initial value of the counter. This is carried out based on a determination that the wire W is not reeled out yet immediately after starting length measurement. Therefore, the value of the counter is 0 at S303.

At S304, an output value of the photosensor 42A is inputted to the counter circuit. Specifically, numerical value 1 is inputted to the counter circuit when the output value (A phase) of the photosensor 42A is ON and numerical value 0 is inputted to the counter circuit when the output value of the photosensor 42A is OFF. This is shown in the flowchart as "An←photosensor 42A (ON=1, OFF=0)". Further, "A" of notation "An" signifies the output value of the photosensor 42A and "n" signifies a number of times of counter execution processings. The number of times of counter execution processings signifies a number of times of execution of a series of processings of changing the numerical value of the counter by the counter circuit. Therefore, for example, notation A1 signifies a value of output wave A when the number of times of counter execution processings is 1.

At S305, the output value of the photosensor 42B is inputted to the counter circuit. Specifically, in the case of ON, numerical value 1 is inputted to the counter circuit and in the case of OFF, numerical value 0 is inputted to the counter circuit. This is shown in the flowchart as "Bn←photosensor 42B (ON=1, OFF=0)". Further, "Bn" of notation "Bn" signifies the output value of the photosensor 42B and "n" shows the number of times of counter execution processings. Therefore, for example, notation B1 signifies a value of the output wave B when the number of times of counter execution processings is B1. Further, the number of times of counter execution processings is incremented by one both in the case of An and the case of Bn.

Next, it is determined whether the rotary encoder 29 is rotated regularly or rotated reversely by determination of S306 through S313. In the case of affirmative determination at S306 through S309, it is determined that the rotary encoder 29 is regularly rotated. In the case of affirmative determination at S310 through S313, it is determined that the rotary encoder 29 is rotated reversely. A criteria of whether the rotary encoder 29 is rotated regularly or rotated reversely, is determined from an interrelationship of sequences in the number of times of counter execution processings at current time and the numbers of times of counter execution processings at successive time. An explanation will be given successively.

At S306 through S313, respectively different patterns are determined with respect to cases of the photosensor 42A and the photosensor 42B when the number of times of counter execution processings is n and when the number of times of counter execution processings is n+1 at successive time.

At S306, in the case of An=ON and the case of Bn=OFF, it is determined whether it is the case of An+1=ON and the case of Bn+1=ON. In the case of affirmative determination, the operation proceeds to S314 and in the case of negative determination, the operation proceeds to S307. In other words, a state in which the photosensor 42A and the photosensor 42B are ON, is set to "1" and a state in which the photosensor 42A and the photosensor 42B are OFF is set to "0", at S306, it is determined whether a combination of A phase and B phase is "10→11" and in the case of affirmative determination, the operation proceeds to S314 where 1 is added to the counter value and it is determined that the regular rotation is being carried out currently. In the case of negative determination, the operation proceeds to S307.

The regular determination is determined in the case of the combination of "10→11" because the case corresponds to "10→11" which is a portion of a combination pattern of A phase and B phase of 00→10→11→01→00 . . . when the pulley 36 is rotated regularly as described above and because the counter value is increased relatively more than the counter value at preceding time. S307 through S313 are processed similarly.

At S307, in the case of An=ON and in the case of Bn=ON, it is determined whether it is the case of An+1=OFF and the case of Bn+1=ON. In the case of affirmative determination, the operation proceeds to S314 and in the case of negative determination, the operation proceeds to S308. At S307, it is determined whether a combination of A phase and B phase is "11→01" and in the case of affirmative determination, the operation proceeds to S314 where 1 is added to the counter value. Further, the combination "11→01" corresponds to "11→01" which is a portion of a combination pattern of A phase and B phase: 00→10→11→01→00 . . . when the pulley 36 is rotated regularly as described above and therefore, this is determined as regular rotation.

Similarly, at S308, in the case of An=OFF and in the case of Bn=ON, it is determined whether it is the case of An+1=OFF and the case of Bn+1=OFF. In the case of affirmative determination, the operation proceeds to S314 and in the case of negative determination, the operation proceeds to S309. At S308, it is determined whether the combination of A phase and B phase is "01→00" and in the case of affirmative determination, the operation proceeds to S314 where 1 is added to the counter value. Further, the combination "01→00" corresponds to "01→00" which is a portion of a combination pattern of A phase and B phase: 00→10→11→01→00 . . . when the pulley 36 is regularly rotated as described above and therefore, this is determined as regular rotation.

Similarly, at S309, in the case of An=OFF and the case of Bn=OFF, is determined whether it is the case of An+1=ON and the case of Bn+1=OFF. In the case of affirmative determination, the operation proceeds to S314 and in the case of negative determination, the operation proceeds to S310. At S309, it is determined whether a combination of A phase and B phase is "00→11" and in the case of affirmative determination, the operation proceeds to S314 where 1 is added to the counter value. Further, the combination "00→10" corresponds to "00→10" which is a portion of a combination patterns of A phase and B phase: 00→10→11→01→00 . . . when the pulley 36 is regularly rotated as described above and therefore, this is determined as regular rotation.

Similarly, at S310, in the case of An=OFF and the case of Bn=ON, it is determined whether it is the case of An+1=ON and the case of Bn+1=ON. In the case of affirmative determination, the operation proceeds to S315 and in the case of negative determination, the operation proceeds to S311. At S310, it is determined whether a combination of A phase and B phase is "01→11" and in the case of affirmative determination, the operation proceeds to S315 where 1 is subtracted from the counter value. Further, the combination "01→11" corresponds to "01→11" which is a portion of a combination pattern of A phase and B phase: 00→01→11→10→00 . . . when the pulley 36 is rotated reversely as described above and therefore, this is determined as the reverse rotation.

Similarly, at S311, in the case of An=ON and the case of Bn=ON, it is determined whether it is the case of An+1=ON and the case of Bn+1=OFF. In the case of affirmative determination, the operation proceeds to S315 and in the case of negative determination, the operation proceeds to S312. At S311, it is determined whether a combination of A phase and B phase is "11→10" and in the case of affirmative determination, the operation proceeds to S315 where 1 is subtracted from the counter value. Further, the combination "11→10" corresponds to "11→10" which is the portion of a combination pattern of A phase and B phase: 00→01→11→10→00 . . . when the pulley 36 is rotated reversely as described above and therefore, this is determined as reverse rotation.

Similarly, at S312, in the case of An=ON and in the case of Bn=OFF, it is determined whether it is the case of An+1=OFF and the case of Bn+1=OFF. In the case of affirmative determination, the operation proceeds to S315 and in the case of negative determination, the operation proceeds to S313. At S312, it is determined whether a combination of A phase and B phase is "10000" and in the case of affirmative determination, the operation proceeds to S315 where 1 is subtracted from the counter value. Further, the combination "10→00" corresponds to "10→00" which is a portion of the combination pattern of A phase and B phase: 00→01→11→10→00 . . . when the pulley 36 is reversely rotated as described above and therefore, it is determined as reverse rotation.

Similarly, at S313, in the case of An=OFF and in the case of Bn=OFF, it is determined whether it is the case of An+1=OFF and the case of Bn+1=ON. In the case of affirmative determination, the operation proceeds to S316 and in the case of negative determination, the operation proceeds to S315. At S313, it is determined whether a combination of A phase and B phase is "00→01" and in the case of affirmative determination, the operation proceeds to S315 where 1 is subtracted from the counter value. Further, the combination "00→01" corresponds to "00→01" which is a portion of the combination pattern of A phase and B phase: 00→01→11→10→00 . . . when the pulley 36 is rotated reversely as described above and therefore, this is determined as reverse rotation.

Next, an explanation will be given in a state of inputting a numerical value to the counter value.

First, a state before switching on the power source is a state in range Z and therefore, the number of times of counter execution processings is also 0. Further, in this case, both of the photosensors 42A and 42B are brought into the state of OFF. Further, the counter circuit is set such that the counter value is "0" when the power source is not switched on. Therefore, both of the photosensors 42A and 42B are brought into the state of OFF-OFF. Further, when the number of times of counter execution processings is "0", there is brought about a state in which even when An and Bn can be satisfied, An+1 and Bn+1 cannot be satisfied yet and therefore, all of determination of S306 through S313 are negatively determined and the operation proceeds to S316.

S316 signifies to add 1 to the counter value. This is shown in the flowchart as n←n+1. Although the number of times of counter execution processings n has been 0, here, n becomes 1.

At S317, it is determined whether length measurement has been finished, that is, whether the wire W has been finished to reel out to the last. When the counter value is 0, length measurement has not been finished yet and therefore, it is determined negatively at 317 and the operation returns to S304.

At S304, n=1 at the current time and therefore, An=A1. Also in this case, the output value of the photosensor 42A is inputted to the counter circuit. Specifically, the numerical value 1 is inputted to the output value of the photosensor 42A in the case of ON and numerical value 0 is inputted thereto in the case of OFF.

At S305, Bn=B1 since n is 1. Also in this case, the output value of the photosensor 42B is inputted. Specifically, numerical value 1 is inputted to the output value of the photosensor 42B in the case of ON and numerical value 0 is inputted thereto in the case OFF.

At S306, it is determined whether in the case of An=A1=ON and the case of Bn=B1=OFF, it is the case of An+1=A2=ON and the case of Bn+1=B2=ON, and in the case of affirmative determination, the operation proceeds to S314 and in the case of negative determination, the operation proceeds to S307.

Similarly, at S307, it is determined whether in the case of An=A1=ON, the case of Bn=B1=ON, it is the case of An+1=A2=OFF and the case of Bn+1=B2=ON, and in the case of affirmative determination, the operation proceeds to S314 and in the case of negative determination, the operation proceeds to S308.

Similarly, at S308, it is determined whether in the case of An=A1=OFF and the case of Bn=B2=ON, it is the case of An+1=A2=OFF and the case of Bn+1=OFF and in the case of affirmative determination, the operation proceeds to S314 and in the case of negative determination, the operation proceeds to S309.

Similarly, at S309, it is determined whether in the case of An=A1=OFF and the case of Bn=B1=OFF, it is the case of An+1=A2=ON and the case of Bn+1=B2=OFF, and in the case of affirmative determination, the operation proceeds to S314 and in the case of negative determination, the operation proceeds to S310.

Similarly, at S310, it is determined whether in the case of An=A1=OFF and the case of Bn=B1=ON, it is the case of An+1=A2=ON and the case of Bn+1=B2=ON, and in the case of affirmative determination, the operation proceeds to S315 and in the case of negative determination, the operation proceeds to S311.

Similarly, at S311, it is determined whether in the case of An=A1=ON and the case of Bn=B1=ON, it is the case of An+1=A2=ON and the case of Bn+1=B2=OFF, and in the case of affirmative determination, the operation proceeds to S315 and in the case of negative determination, the operation proceeds to S312.

Similarly, at S312, it is determined whether in the case of An=A1=ON and the case of Bn=B1=OFF, it is the case of An+1=A2=OFF and the case of Bn+1=B2=OFF and in the case of affirmative determination, the operation proceeds to S315 and in the case of negative determination, the operation proceeds to S313.

Similarly, at S313, it is determined whether in the case of An=A1=OFF and the case of Bn=B1=OFF, it is the case of An+1=A2=OFF and the case of Bn+1=B2=ON and in the case of affirmative determination, the operation proceeds to S315 and in the case of negative determination, the operation proceeds to S316.

At S316 the value of n at the current time becomes n=1+1=2.

At S317, the above-described series of processings are repeated until length measurement is finished. Further, when length measurement has been finished, the operation proceeds from S317 to S318 and holds a counter value at time point at which length measurement has been finished, that is, the rotational number previously allocated to the length measurement servo motor 14 in reeling out the wire W of an amount of the standard value is reached. Specifically exemplified, assume that an amount of reeling out the wire W (rectified reel out amount) when the length measurement servo motor 14 is rotated by 10 rotations, is 10 centimeters. Then, when the length measurement servo motor 14 is rotated by 10 rotations, it is determined that length measurement has been finished by the main computer 21 and when the counter value is, for example, 10 counts at this occasion, at S318, the count value 10 is held in the counter circuit 47.

At S319, the held counter value is outputted to the main computer 21. The processings thereafter is carried out at S107, described above.

Next, operation and effect of the harness making apparatus A constructed by such a constitution will be explained.

According to the electric harness fabricating apparatus A, before the wire W is supplied to the pressure welding apparatus B, the wire supply apparatus C measures the length of the wire W by utilizing the rotary encoder 29 which is the supply amount detecting apparatus installed there.

Further, the pressure welding apparatus B includes the main computer 21 and the main computer 21 functions as the calculating means for comparing the measured length value by the wire reel out means 10 and the detected value by the rotary encoder 29 and calculating the difference between the two numerical values. Moreover, the computer functions also as the comparing means for comparing the calculated difference with the previously allowable range. Further, when the difference exceeds the allowable ranged by the comparison by the comparing means, the computer functions also as the determining means for determining that there is an abnormality in the measured length by the wire reel out means 10.

Therefore, at a previous stage of forming the harness H into a product, that is, before integrating the wire W to the master connector Cp and the slave connector Cc, it can be determined whether the wire W is provided with the standard value. Therefore, since the dimensional accuracy of the wire W can be increased, the yield of the wire harness H can be increased.

Further, the rotary encoder on sale is applicable. However, with regard to provision of the rotary encoder to the pressure welding apparatus B in correspondence with the plurality of wires arranged at a pitch of a unit of several millimeters described above, in view of the fact that the pressure welding apparatus is an apparatus of pressure-welding the connectors to the plurality of wires aligned at a pitch of a unit of several millimeters, the pressure welding apparatus B is a comparatively small apparatus. In contrast thereto, the wire supply apparatus C is a comparatively large apparatus and therefore, there is an allowance in view of the space in providing the rotary encoder 29 thereto and therefore, there is achieved an advantage of capable of simply installing the rotary encoder 29.

There may be provided informing means of an alarm or the like operated when it is determined that the actual reel out amount of the wire W by the wire reel out means 10 differs from the rectified reel out amount as a result of determination by the main computer 21 which is the wire reel out amount abnormality determining means.

Further, according to the embodiment, there is exemplified a constitution of a type of reeling out a plurality of pieces of wires by a pair of the upper roller 71 and the lower roller 72. However, as shown by, for example, Japanese Patent Publication No. 2750497, the embodiment is applicable also to a case of providing the wire reel out means 10 in correspondence with the respective wires. In this case, the length measurement servo motor 14 is electrically connected to respectives of the rotary encoder 29 and the comparator 48. Thereby, the length can be verified for the respective piece of the wire and therefore, the electric harness H having higher accuracy can be fabricated.

Although according to the embodiment, a description has been given of the case of the wire W which is the constituent element of the electric harness H, the embodiment is not naturally limited to the wire. In sum, the invention is an apparatus of supplying a flexible long object for measuring a supply amount of the flexible long object fed to a flexible long object utilizing product fabricating apparatus for forming a product by utilizing the flexible long object of the wire or the like, by using a rotary encoder which is a supply amount detecting apparatus.

Further, movement of the pulley 36 by an amount in correspondence with the rotational direction and the count number of the pulley 36, in other words, the length of reeling out the wire W can be detected by outputting two phase pulses of A phase and B phase and therefore, the structure can be simplified. Therefore, when the pulley 36 is rotated reversely in a state in which the pulley 36 is inherently to be rotated regularly, abnormality of supply of the wire can simply be discovered and therefore, the abnormality can be dealt with swiftly by that amount.

What is claimed is:

1. An electric harness fabricating apparatus comprising:

wire reel out means provided at a pressure welding apparatus for pressure-welding a connector to a wire which is a constituent element of an electric harness for reeling out the wire;

a supply amount detecting apparatus provided at a wire supply apparatus for supplying the wire to the pressure welding apparatus for detecting an amount of supplying the wire from the wire supply apparatus to the pressure welding apparatus;

calculating means for comparing the amount of reeling out the wire reeled out by the wire reel out means and a detected value detected by the supply amount detecting apparatus and calculating a difference therebetween;

comparing means for comparing the difference calculated by the calculating means with a previously determined allowable range; and wire reel out amount abnormality determining means for determining that an actual amount of reeling out the wire by the wire reel out means is different from the rectified reel out amount when the difference exceeds the allowable range by a comparison by the comparing means;

wherein the supply amount detecting apparatus comprises a slit circular disk, having a light blocking portion and a light transmitting portion, and two photosensors, each photosensor having means for generating a steady optical path of light.

2. The electric harness fabricating apparatus of claim 1, wherein the supply amount detecting apparatus is an encoder.

* * * * *